March 21, 1961
H. E. BOOHER
2,976,396
WELDING ELECTRODE HOLDER
Filed June 12, 1959
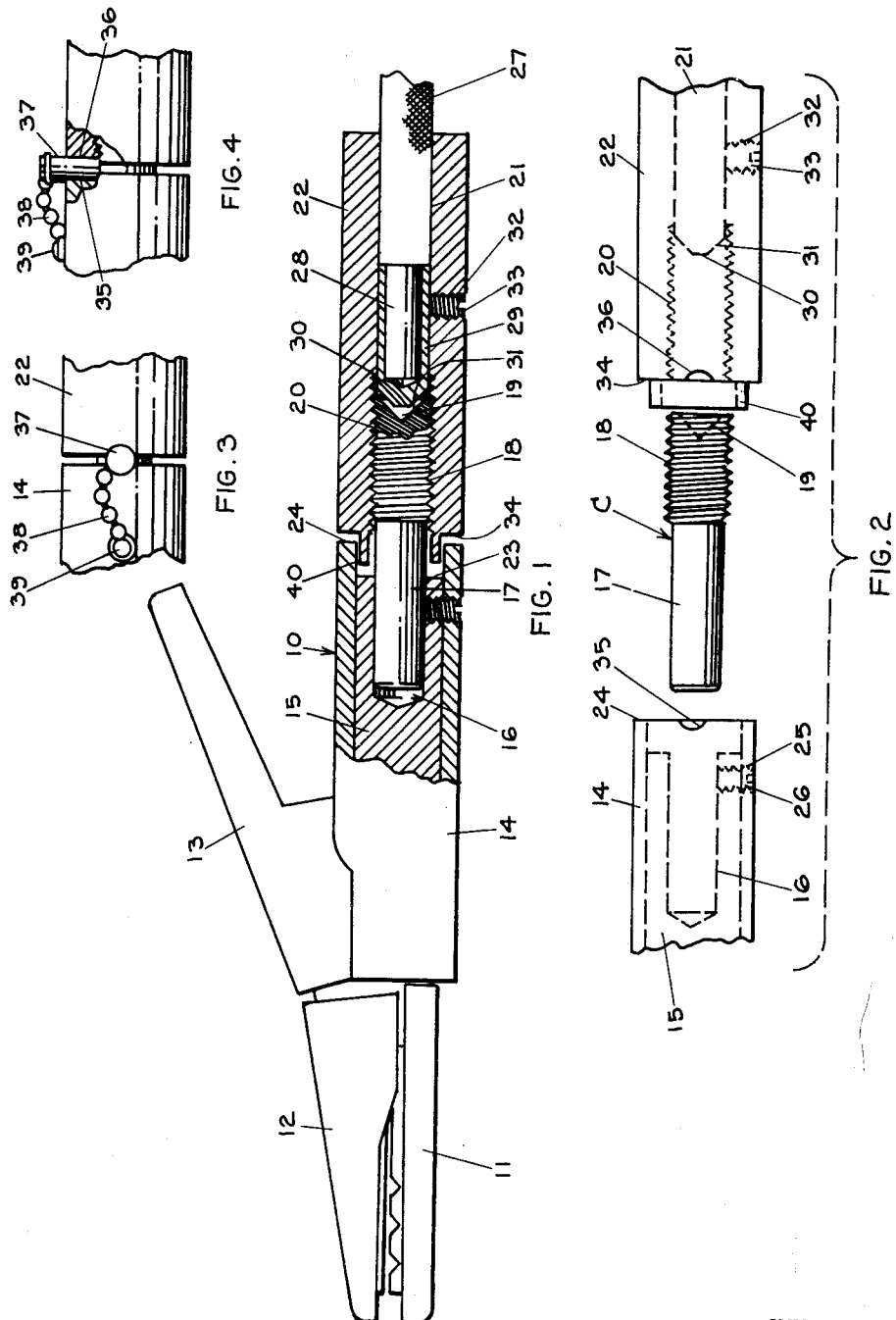
INVENTOR.
HAROLD E. BOOHER
BY
Salvatore G. Militana
attorney United States Patent Office 2,976,396
Patented Mar. 21, 1961

2,976,396

WELDING ELECTRODE HOLDER

Harold E. Booher, 201 E. 37th St., Hialeah, Fla.

Filed June 12, 1959, Ser. No. 819,875

2 Claims. (Cl. 219—138)

The present invention relates to welding electrode holders of the type used by electric welders both as a handle by which the welding rod is held and also as a connecting means for the welding cable and welding rod and is particularly directed to such apparatus provided with a circuit breaking means.

A principal object of the present invention is to provide a welding electrode holder with switch means for readily and quickly making or breaking the connection leading to the hot welding cable thereby reducing the danger of maintaining the electrode connected to a source of electricity when the holder is not in actual use.

Another object of the present invention is to provide a welding electrode holder with separable handle means wherein a twist of the handle means in one direction will break a contact and cut off the current of electricity to the electrode while a twist of the handle in the other direction will cause a pair of contact members to make contact and restore the flow of electricity to the electrode.

A further object of the present invention is to provide a welding electrode holder with a pair of contacts which are readily actuated to make and break contact with each other for the control of the flow of electricity to the electrode as well as to effect a wiping action between them as the contact is made whereby a proper electrical contact is always made.

A still further object of the present invention is to provide a welding electrode holder with a switch device, which when operated to maintain a break in the flow of electricity to the welding rod is maintained thusly by a locking pin, the circuit remaining broken until the locking pin is removed and the switch device actuated to close the circuit.

A still further object of the present invention is to provide a welding electrode holder with circuit breaking means which is extremely simple in construction and in operation thereby reducing to a minimum the danger of being burnt, hurting one's eyes and damaging the equipment caused by inadvertent grounding of the electrode when laying the holder down between welding jobs.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a side elevational view partially in cross section of a welding electrode holder constructed in accordance with my invention.

Figure 2 is an exploded detail view of the various parts constituting my invention.

Figure 3 is a fragmentary side elevational view showing my locking arrangement for maintaining an open circuit.

Figure 4 is a similar view with parts partially broken away.

Referring to the drawing wherein like numerals are used to designate similar parts throughout the several views, the numeral 10 refers generally to a welding electrode holder consisting of a conventional gripping tong of a stationary lower jaw 11, movable upper jaw 12 to which a handle 13 is secured and a main body member 14. The main body member 14 is generally tubular in shape and is constructed of plastic and the like which serves as an insulator. The handle 13 and upper movable jaw 12 which are secured together to operate in unison are constructed of plastic material and the handle 13 is pivotally mounted on the main body member 10 in a conventional manner and not shown in detail herein. Within the main body member 14 there is telescopically fitted a cylindrical contact member 15 which is electrically connected to the lower jaw member 11 and whose free end 23 terminates short of a free end 24 of the main body member 14.

The contact member 15 is provided with a longitudinally disposed bore 16 which extends rearwardly of the holder 10 for receiving a stem portion 17 of a connector C whose other end, its threaded body portion 18 is threaded as shown. The free end of the threaded main body portion 18 is provided with a concentric conical bore 19 whose function is explained in greater detail hereinafter. To secure the connector C in position within the longitudinal bore 16 of the main body member 14 a bore 25 is tapped through the walls of the main body member 14 and contact member 15 at the position of the longitudinal bore 16 and a set screw 26 threaded therein and tightened against the stem 17 of the connector C.

The threaded main body portion 18 of the connector C is received by a threaded portion 20 of a bore 21 formed in an insulated sleeve 22. Received at the other end of the bore 21 is one end 28 of an insulated electric cable 27, the end 28 having had the insulation removed and a cup shaped contact element 29 mounted thereon. The free end of the contact element 29 is blunt as at 30 with conical side walls 31 joining the blunt end 29 and the main portion of the contact element 29. The conical wall 31 of the cup shaped contact element 29 slopes at approximately the same angle as the conical bore 19 at the free end of the connector C so that when brought into abutting relationship the walls 31 and 19 will contact each other along approximately their full lengths. The sleeve 22 is provided with a transversely disposed bore 32 for receiving a set screw 33 which when tightened therein will bear against the contact element 29 and secure the latter within the sleeve 22. A concentric collar 40 of reduced outer diameter which extends outwardly of the sleeve 22 acts as a baffle to prevent the accidental touching of the connector C when the main body member 14 and the sleeve 22 are not threaded tightly together.

At the inner edges 34 and 24 of the main body member 14 and the cylindrical sleeve 22 there are radially disposed arcuate slots 35 and 36 respectively whose function is explained hereinafter.

In the assembly of the welding electrode holder 10, the electric cable 27 with the contact element 29 mounted thereon is inserted in the bore 21 of the sleeve 22 and the set screw 33 is tightened against the contact element which is now secured against movement therein.

The connector C is then inserted in the sleeve 22 with the threads 18 engaging the threaded bore 20 and the connector C is tightened therein until the conical bore 19 at the free end of the connector C abuts against and engages tightly the conical side walls 31 of the connector 29. The main body member 14 is then taken and the stem portion 17 of the connector C is placed into the bore 16. The main body member 14 and the sleeve 22 are made to slide in a direction toward each other until the baffle collar 40 is received by the main body member 14, their inner edges 24 and 34 are in contact relation with each other and the arcuate slots 35 and 36 are in alignment with each other. Then the set screw 26 is tightened in the bore 25 against the stem 16 of the connector C to lock the main body member 14 and the connector C together. With the various parts positioned as described, electricity will flow from the electric cable 27 to the contact element 29, connector C and jaw member 11 so that when a welding rod is placed in position between the jaws 11 and 12, and grounded in the normal procedure, there will be an arc formed at the end of the rod to effect the welding function. When it is decided to cease welding, all that need be done is rotate the main body member 14 only one or two complete turns so as to unthread the connector C from the sleeve 22. The contact members 18 and 29 will draw away from each other so that a gap or space will be found between the conical bore 19 and the conical side wall 31 to stop or interrupt the flow of electricity to the lower jaw and the welding rod held by the jaw.

With the circuit broken, there is now no danger of grounding the welding rod being held between the jaws 11 and 12. The operator of the device 10 is made aware of the fact that the welding rod is not hot and the electric circuit broken at the contacts 20, 29 by the gap or space that appears between the ends 24 and 34 of the main body member 14 and sleeve 22 respectively. To resume the welding operation, the operator rotates the sleeve 22 while holding the main body member against rotation, or vice versa, thereby causing the sleeve 22 to move in the direction of the main body member 14. The end portions 24 and 34 now move in towards each other to close the space therebetween as the contact member 29 comes into contact relation with the connector C. A final twist of the sleeve 29 causes the conical wall 31 of the contact member 29 to rub or wipe its complete surface against that of the conical bore 19 of the connector C to effect a clean and tight electrical contact between the aforementioned parts. The electrode holder 10 is now ready for the resumption of welding operation.

Again, when the operator desires to stop welding, he unthreads the sleeve 22 from the main body member 14 until the space or gap between the end portions 24 and 34 of the main body member 14 and sleeve 22 respectively is sufficiently large to permit the pin 32 to be inserted into the aligned slots 35 and 36. The flow of electricity to the electrode is interrupted or broken at the contact member 29 which is now positioned out of contact with the connector C.

The sleeve 22 and main body member 14 can be maintained in their non-operation position against the inadvertent rotation of either member 22, 14 to close the circuit, the locking pin 37 is inserted into the aligned arcuate bores 35 and 36. So long as the pin 37 remains positioned therein, the sleeve 22 cannot be rotated with relation to the main body member 14 and the lower jaw 11 cannot become connected to the source of electricity. The collar 40 acts as a baffle to prevent contacting the connector C through the gap formed between the end portions 24, 34 of the main body member 14 and sleeve 22. It is to be noted that the design of the main body portion of the conventional tong type welding rod holders has not been altered thereby permitting applicant's device to be readily added to the conventional holders at a minimum of trouble and expense.

What I claim as new and desire to secure by Letters Patent of the United States is:

1. A welding rod holder comprising a main body member having a substantially cylindrical cross section, a connector having a stem portion and a threaded portion, means securing said stem portion of said connector in said main body member with said threaded portion extending outwardly of said main body member, said main body member having a peripheral slot adjacent said stem portion, said threaded portion of said connector having a conical end portion, a substantially cylindrical sleeve member threadedly mounted on said connector at one end, a substantially cylindrical flange portion mounted at said one end of said sleeve member and extending into said peripheral slot, a contact member secured in said sleeve member, said contact member having a tapering front wall portion in contact relation with said conical end portion of said connector whereby upon the unthreading of said sleeve member said contact is broken between said contact member and said connector and a gap appears between said main body member and said sleeve member.

2. A welding rod holder comprising a main body member having a substantially cylindrical cross section, a connector having a stem portion and a threaded portion, means securing said stem portion of said connector in said main body member with said threaded portion extending outwardly of said main body member, said main body member having a peripheral slot adjacent said stem portion, said threaded portion of said connector having a conical end portion, a substantially cylindrical sleeve member threadedly mounted on said connector at one end, a substantially cylindrical flange portion mounted at said one end of said sleeve member and extending into said peripheral slot, a pair of arcuate slots on said main body member and said sleeve member adjacent each other, a contact member secured in said sleeve member, said contact member having a tapering front wall portion in contact relation with said conical end portion of said connector whereby upon the unthreading of said sleeve member said contact is broken between said contact member and said connector and a gap appears between said main body member and said sleeve member, a pin, and extensible means securing one end of said pin whereby said pin may be inserted in said opening formed by said arcuate slots for securing said sleeve against turning and thereby preventing said contact member from contacting said connector.

References Cited in the file of this patent

UNITED STATES PATENTS

| | | |
|---|---|---|
| 1,812,142 | Dreyer | June 30, 1931 |
| 1,865,003 | Hall | June 28, 1932 |
| 2,415,778 | Welch | Feb. 11, 1947 |